United States Patent
Wettstein

(12) 
(10) Patent No.: US 6,330,515 B1
(45) Date of Patent: Dec. 11, 2001

(54) METHOD FOR PROTECTING AGAINST VIBRATIONS IN ROTARY MACHINES

(75) Inventor: Hans Wettstein, Fislisbach (CH)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/079,179

(22) Filed: May 15, 1998

(30) Foreign Application Priority Data

May 22, 1997 (DE) ............................................. 197 21 364

(51) Int. Cl.$^7$ ................................................... G01M 15/00
(52) U.S. Cl. ................................ 702/56; 702/33; 73/570; 73/593; 73/597
(58) Field of Search ................................. 702/56, 33, 34, 702/176, 113, 145, 182; 73/56, 593, 660, 462, 570, 597, 672, 54.24, 54.28, 54.41; 324/207.25, 226

(56) References Cited

U.S. PATENT DOCUMENTS

| | | |
|---|---|---|
| 4,377,284 | 3/1983 | Saito et al. . |
| 4,408,294 | 10/1983 | Imam . |
| 4,453,407 * | 6/1984 | Sato et al. ............................. 73/462 |
| 4,643,023 | 2/1987 | Capps . |
| 5,018,342 | 5/1991 | McClure et al. . |

FOREIGN PATENT DOCUMENTS

| | | |
|---|---|---|
| 37 25 123 | 4/1988 | (DE) . |
| 37 04 597 | 8/1988 | (DE) . |
| 38 12 474 | 11/1988 | (DE) . |
| 39 29 792 | 3/1990 | (DE) . |
| 40 20 119 | 2/1991 | (DE) . |
| 41 07 575 | 11/1991 | (DE) . |
| 40 29 616 | 3/1992 | (DE) . |
| 44 06 723 | 9/1994 | (DE) . |
| 295 13 754 U | 12/1995 | (DE) . |
| 195 48 279 | 4/1997 | (DE) . |
| 196 25 947 | 9/1997 | (DE) . |
| 0 355 255 | 2/1990 | (EP) . |
| 0 536 451 A1 | 4/1993 | (EP) . |
| 2 225 163 | 5/1990 | (GB) . |

* cited by examiner

Primary Examiner—Marc S. Hoff
Assistant Examiner—Hien Vo
(74) Attorney, Agent, or Firm—Burns, Doane, Swecker & Mathis, L.L.P

(57) ABSTRACT

In a method for initiating protective measures on rapidly running rotary machines upon the occurrence of impermissible vibrations, or other disturbances which cause vibrations, the vibrations are measured as measured variables essentially at the bearings of the rotors or derived values. In a first relatively long time interval (t1) a number of measured data of this measured variable are recorded and conditioned using an equalizing function. In a second, relatively short time interval (t2) the measured data of the same measured variable which are current in this time interval are recorded. Thereafter, these current measured data are compared with the conditioned measured data of the relatively long time interval (t1) and, depending on the result of the comparison, a monitoring signal corresponding the result, or an emergency shutdown signal is triggered.

11 Claims, 2 Drawing Sheets

METHOD FOR PROTECTING AGAINST VIBRATIONS IN ROTARY MACHINES

Figure 1:
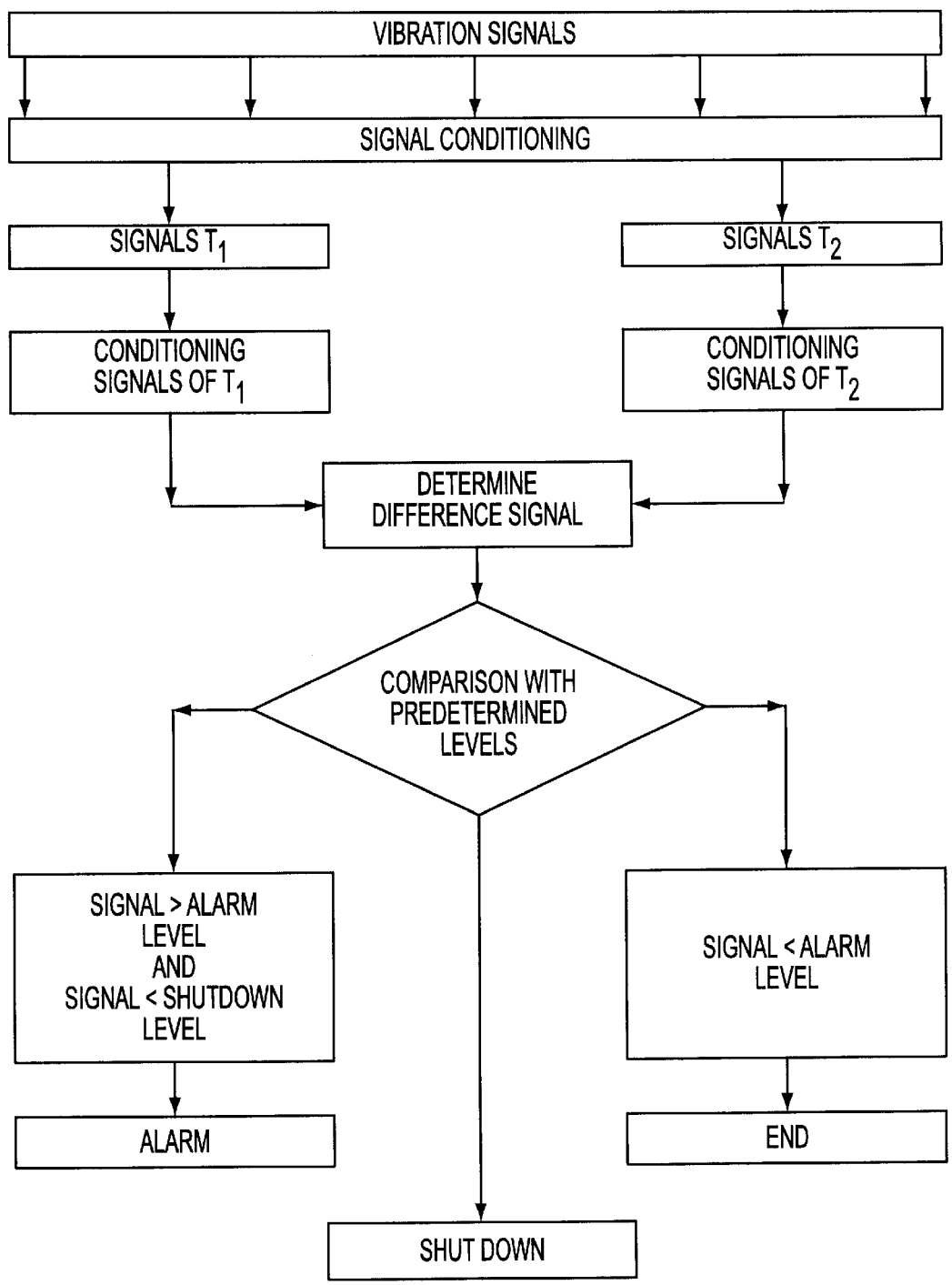
Figure 2A:
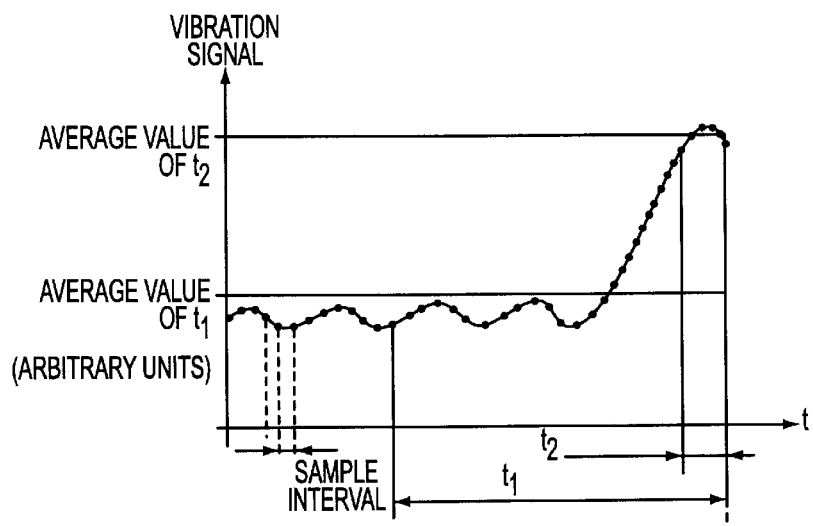
Figure 2B:
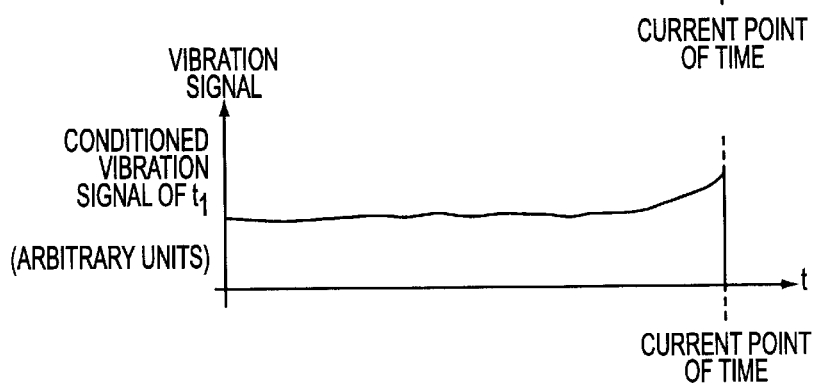
Figure 2C:
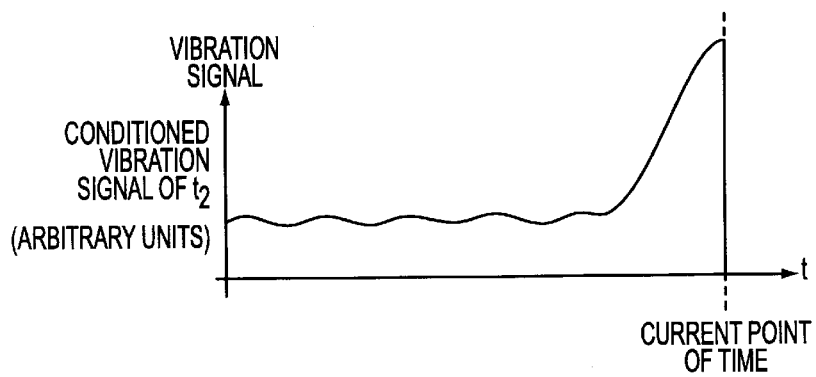
Figure 2D:
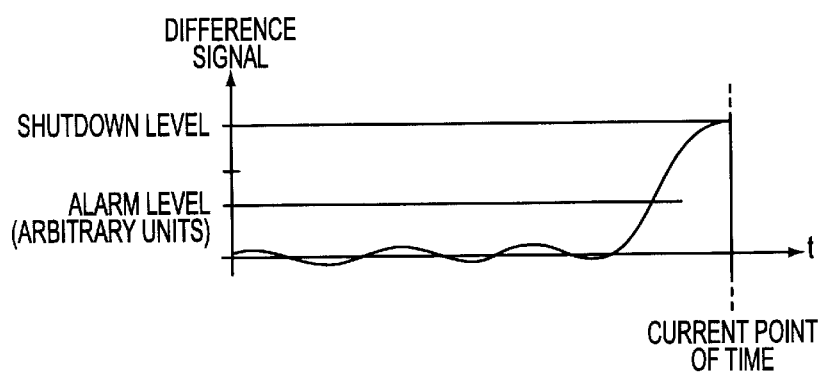

This application claims priority under 35 U.S.C. §§119 and/or 365 to No. 197 21 364.2 filed in Germany on May 22, 1997; the entire content of which is hereby incorporated by reference.

BACKGROUND OF THE INVENTION

1. Field of the invention

The invention relates to a method for initiating protective measures on rapidly running rotary machines upon the occurrence of impermissible vibrations, the vibrations or values derived therefrom essentially being measured as measured variables at the bearings of the rotors.

2. Discussion of Background

In known methods for protecting rapidly running rotary machines in which impermissible vibrations can occur which can destroy the installation, the result being the need to change the operating state as required or in a plannable fashion by means of monitoring signals, the vibration amplitudes or their maximum value are mostly measured in the region of the rotor bearings and compared with prescribed limits for alarm measures or emergency measures. If these limit values are exceeded, monitoring signals are generated as a function of these limit values which set the installation to a different rotational speed, for example, or shut it down completely. In this case, the measuring points can be arranged at a plurality of different sites in the installation, and the data can be processed at the same time. Thus, it is also possible to make use for evaluation of only two of three measured data.

Depending on the particular features and the frequently changing environmental conditions of the installation, however, the limit values fixed in advance can be inappropriate and set off false alarms. Such false alarms, in particular when they are associated with emergency shutdowns, cause a very substantial outlay on restarting and other additional costs, which should be avoided as far as possible. In particular, these limit values cannot be fixed uniquely for technical reasons alone, since, for example, they depend on the duration of a specific operating state, for example the start up state, the degree of warming, generally connected thereto, etc., and fluctuate strongly in many cases. Taking account also of measured data which change in such a way involves a high outlay on equipment and processing, and the aim is to make the monitoring as simple as possible. In particular, because the monitoring units can also fail or must be provided in a fashion which is fail-safe or redundant. Moreover, almost all disturbances which require a protective shutdown caused by vibrations occur suddenly. For this reason, a temporary increase in the limit values in the case of such transitional operating states poses a high risk to the installation. For example, if a blade breakage occurred on a turbo-machine precisely in such a phase, the machine might not shutdown, and further, secondary damage could be entailed.

SUMMARY OF THE INVENTION

Accordingly, one object of the invention is to provide a novel method in which it is possible reliably to distinguish between faulty states of the machine and alternating actions caused by operation, in particular by vibrations or the like in an attempt to avoid the above disadvantages.

This object is achieved according to the invention in that in as first, relatively long time interval a number of measured data of this measured variable are recorded and conditioned using an equalizing function, in that in a second, relatively short time interval, which is located inside the relatively long time interval, current measured data of the same measured variable are recorded and compared with the conditioned measured data of the relatively long time interval, and in that depending on the result of the comparison a monitoring signal corresponding to said result is triggered.

The particular advantage of the invention is to be seen in that the protective actions are automatically initiated when rapid changes occur in the vibration values. The measure permits changes to be detected within second or even fractions thereof. The protective actions themselves can be performed in stages, it being the case that depending on the level of the limit value reached, actions are triggered with increasing effectiveness, for example, firstly raising the alarm, thereafter process-specific action, power reduction and, finally, emergency shutdown. Although the invention does not aim to detect long-term trends, or to set absolute limit values for the vibration amplitudes, these measures can advantageously be combined with the invention. The above-mentioned limit values can thus be set somewhat higher than previously, as a result of which unnecessary protective initiations can be avoided in certain circumstances.

Further features and advantages follow from the further claims and from the description of an exemplary embodiment.

DESCRIPTION OF THE DRAWING FIGURES

The invention of the present application will now be described in more detail with reference to preferred embodiments of the apparatus and method, given only by way of example, and with reference to the accompanying drawings, in which:

FIG. 1 schematically illustrates an exemplary process in accordance with the present invention; and FIG. 2 illustrates data graphs in accordance with one aspect of the present invention.

DESCRIPTION OF THE PREFERRED EMBODIMENTS

In rapidly running rotary machines, for example gas turbines or steam turbines, turbocompressors, pumps or the like, vibrations can propagate from rotors etc. via the shaft bearings onto the entire installation. Such vibrations or values derived or calculated therefrom are preferably detected as measured variables at the bearings of the rotors, in order to monitor the machine.

Turning now to FIGS. 1 and 2, for a specific measured variable, in a first relatively long time interval (t1) a number of measured data of this measured variable are recorded and conditioned using an equalizing function. In a second, relatively short time interval (t2), current measured data of the same measured variable are recorded. It is possible in this case to undertake only a single measurement in this relatively short time interval and compare it with the conditioned measured data of the relatively long time interval (t1). Of course, it is also possible to perform and condition a plurality of measurements of this measured variable in this relatively short time interval, in order to compare them as conditioned data with the data conditioned in the relatively long, first time interval (t1). In this process, however it is also possible to form a difference instead of making a comparison, in order to compare the difference value with a limit value. Depending on the result of the comparison, a monitoring signal corresponding to said result is triggered; this can be an emergency shutdown signal, or else simply a signal to reduce rotational speed etc., in order to achieve a transition to another operating state. The two time intervals (t1, t2) generally overlap. They end with the last measurement reading. The temporal spacing of these two measuring intervals is also governed again by the features of the installation and its process frequencies. In most cases, the second time interval (t2) is selected as conditioned by the process and monitoring to be substantially shorter than the first time interval (t1), because after all the rapidly occurring faults, such as blade cracks or blade breakages in the case of turbo-machines etc., are preferably to be detected. In the relatively short time interval (t2), which can last only fractions of a second, exactly one measurement reading is undertaken as a rule. The first time interval (t1), by contrast, is of the order of magnitude of seconds to minutes. Likewise, it is preferred for the arithmetic mean, the geometric mean or a weighted mean, or moments of the second or higher order or the like respectively to be used as equalizing function. However, it is also possible, of course, to use any other mathematical function which is right for the processes to be monitored on the machine.

The application of the new method is recommended, in particular, in the case of stationary gas turbines, because the method automatically adapts to the respective normal operating state, on the one hand, and substantially narrower limit values can be prescribed than would be the case without taking account of the instantaneous normal operating state of the machine, on the other hand. In addition, these limit values are independent of the instantaneous state of unbalance of the rotor. It is therefore possible to eliminate bulky devices for taking account of the individual operating states, for example in the course of a startup phase.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A method for initiating protective measures on rapidly running rotary machines upon the occurrence of impermissible vibrations, the vibrations or values derived therefrom essentially being measured as measured variables at the bearings of the rotors, comprising:

measuring data values of said variables in a first time interval (t1);

using an equalizing function upon said first time interval data values to obtain conditioned first time interval data values;

measuring current data values of said variables in a second time interval (t2), said second time interval being shorter than said first time interval and located inside the first time interval (t1);

comparing the second time interval data values with the conditioned first time interval (t1) data values; and triggering protective actions with increasing effectiveness depending on the result of the comparing step.

2. The method as claimed in claim 1, wherein said comparing step comprises individually comparing the data values of the second time interval (t2) with the conditioned data values of the first time interval (t1).

3. The method as claimed in claim 1, further comprising:

using an equalizing function upon said second time interval data values to obtain conditioned second time interval data values; and said comparing step comprises comparing the conditioned second time interval data values with the conditioned measured data of the first time interval (t1).

4. The method as claimed in claim 1, wherein the first and second time intervals (t1, t2) immediately follow one another.

5. The method as claimed in claim 1, wherein the first and second time intervals (t1, t2) end at the same time.

6. The method as claimed in claim 1, wherein said step of measuring current data values of said variables in said second time interval comprises measuring exactly one measurement reading in the second time interval (t2).

7. The method as claimed in claim 6, wherein the duration of the first time interval (t1) is on the order of seconds to minutes.

8. The method as claimed in claim 1, wherein said equalizing function comprises the arithmetic mean, the geometric mean, a weighted mean, or moments of the second or higher order.

9. The method as claimed in claim 1, wherein said step of triggering protective actions comprises triggering one of an alarm, power reduction, and emergency shutdown depending on the result of the comparing step.

10. The method as claimed in claim 2, wherein said step of individually comparing comprises forming the difference between the data values of the second time interval (t2) and the conditioned data values of the first time interval (t1).

11. The method as claimed in claim 3, wherein said step of comparing comprises forming the difference between the conditioned data values of the second time interval (t2) and the conditioned data values of the first time interval (t1).

* * * * *